United States Patent [19]

Tulen et al.

[11] 4,410,048

[45] Oct. 18, 1983

[54] REPLACEMENT SPOONS AND FIXTURES FOR ROTARY HOE

[76] Inventors: Jack A. Tulen, R.R. #1, Coatsworth, Ontario, Canada, NOP 1H0; James L. Tulen, R.R. #1, Wheatley, Ontario, Canada, NOP 2P0

[21] Appl. No.: 264,967

[22] Filed: May 18, 1981

Related U.S. Application Data

[63] Continuation of Ser. No. 83,158, Oct. 9, 1979, Pat. No. 4,276,686.

[51] Int. Cl.³ .............................................. A01B 39/08
[52] U.S. Cl. .................................... 172/540; 172/556; 172/719; 29/148.3
[58] Field of Search .............. 172/540, 556, 719, 549, 172/548, 551, 554, 555; 29/148.3, 402.09, 402.13, 402.16, 402.11

[56] References Cited

U.S. PATENT DOCUMENTS

| 484,758 | 10/1892 | Sears | 172/719 |
|---|---|---|---|
| 1,916,833 | 7/1933 | Gadd | 172/719 |
| 2,148,925 | 2/1939 | Bochy | 29/148.3 |
| 2,177,026 | 10/1939 | Nightenhelser | 172/551 X |
| 2,388,553 | 11/1945 | Kraus | 172/556 |
| 2,597,742 | 5/1952 | Mahoney | 172/556 |
| 2,691,933 | 10/1954 | Emerson | 172/548 |
| 3,175,522 | 3/1965 | Garber | 172/462 X |
| 4,033,270 | 7/1977 | Bezzerides | 172/540 |

FOREIGN PATENT DOCUMENTS 1391602 4/1975 United Kingdom ............... 172/548

*Primary Examiner*—Richard J. Johnson
*Attorney, Agent, or Firm*—Allen D. Gutchess, Jr.

[57] ABSTRACT

This invention consists of a device by means of which worn out spoons on the teeth of the wheels of rotary hoes can be easily replaced. It consists of individual spoons which replace the worn out spoons, and portable fixtures which guide and hold the new spoons in the proper position for welding them to the existing teeth.

8 Claims, 7 Drawing Figures

REPLACEMENT SPOONS AND FIXTURES FOR ROTARY HOE

This is a continuation of application Ser. No. 83,158, filed Oct. 9, 1979, now U.S. Pat. No. 4,276,686.

A modern type of hoe which is used to break up the soil between rows of growing plants, is the rotary hoe which consists primarily of a number of spaced, rotating wheels which are mounted on a horizontal shaft. These wheels consist of a central hub from which extend, radially, a number of equally spaced, elongated teeth which terminate at their free ends into attached spoon-shaped diggers, which, for the purpose of this description will be referred as spoons.

The abrasive action of the soil upon the spoons, wears them down, after a comparatively short period of use, so that they have to be replaced. The present day practice consists of replacing the entire wheel, making it a very costly operation. One solution to the problem consists of retaining the original wheel and welding on or in any other manner attaching new spoons to the existing wheel teeth. Since this requires the services of skilled machinists working with machine shop equipment, the cost of replacement of the spoons made the operation almost as expensive as the replacement of the entire wheel.

It therefore became obvious that the solution to the problem consists in providing a means for replacing the spoons by the owner or his help, who usually are not trained machinists and to whom there is no available machine shop tools, except a simple welding unit.

This is accomplished with the aid of this invention which consists of a lengthweight portable fixture which holds the spoon up against the tooth in the proper position for welding it to the tooth.

In describing the invention, reference will be made to the attached drawing in which, FIG. 1 shows a front view of part of a hoe wheel with the invention attached thereto.

Figure 1:
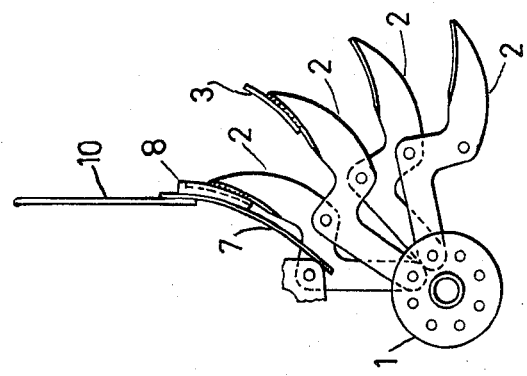
Figure 5:
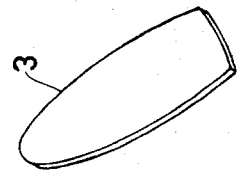
FIG. 5 shows a view of the spoons.

In the drawings, FIG. 1, shows the construction of one of the commonly used hoe wheels, having a hub 1, to the perimeter of which are radially attached a number of equally spaced, flat plate teeth 2 which are offset at about their centers to allow the teeth 2 to be attached to each other. Attached to the free end of each tooth is a spoon 3, the rounded edge of which extend beyond the tip of the tooth 2. A detail of the spoon 3, is shown in FIG. 5. It has a straight base at the bottom, a rounded tip at its top, and is slightly concave.

Figure 3:
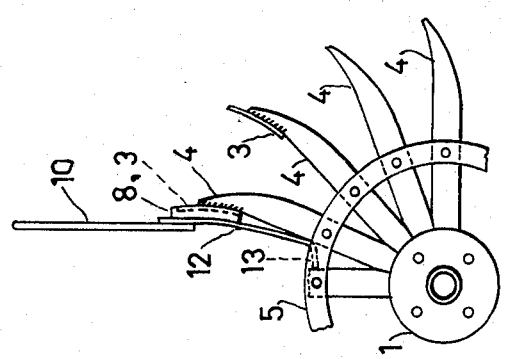
FIG. 3 shows a front view of another form of a hoe wheel with a variation of the invention attached thereto.

A common variation in the structure of the hoe wheel is shown in FIG. 3. In this case, the teeth 4, are attached to each other by means of a ring 5 abutting the teeth 4, on each side, said teeth being rivetted to said rings.

Figure 6:
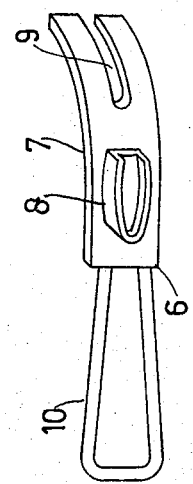
FIG. 6 shows a detailed view of the invention.

The invention shown in FIG. 6, is a fixture 6 by means of which the replacement spoon 3 can be held in the proper location on the tooth 3, while it is being welded thereto. It consists of a curved plate 7, made of iron or steel, wide enough for attachment to it, at the upper end of its convex side, an open faced container 8, into which fits tightly one of the spoons 3. The bottom end of the plate 7 is cut into a centrally located notch 9, which runs part way up the plate. A U-shaped handle 10 is attached to the upper edge of the concave side of the plate 7.

Figure 2:
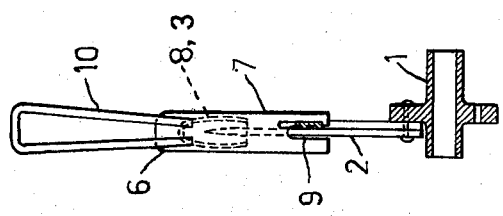
FIG. 2 shows a side view of FIG. 1.

In FIGS. 1 and 2, is shown the manner in which the fixture 6 is used in the welding of the replacement spoon 3, to the tooth 2. The procedure consists of fitting the spoon 3 into the container 8, placing the plate 7 so that the notch 9 straddles the offset part of the tooth 2; the fixture 6, is then pressed and held against the tooth 2 by the handle 10, so that the convex face of the spoon in the container makes contact with the tooth, and is then welded to it. The container 8 is located on the plate 7, to provide the exact location of the spoon on the tooth.

Figure 4:
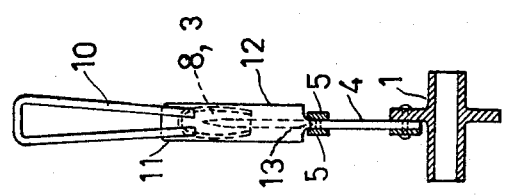
FIG. 4 shows a side view of FIG. 3.
Figure 7:
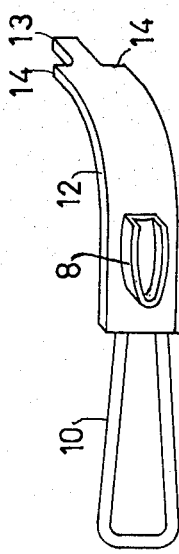
FIG. 7 shows a detailed view of the variation in the invention.

In a similar manner, the fixture 11, is used to weld the spoon 3 to the teeth of the wheel shown in FIGS. 3 and 4. The fixture 11, is provided with a plate 12 which is similar to the plate 7, except that its bottom end terminates into a short, narrow, centrally located extension 13, which when the fixture 11 is to be used on the wheel shown in FIG. 3, is inserted between the rings 5,5, so that the shoulders 14,14, rest upon the upper perimeter of the said rings. In each of the fixtures 6 and 11, the container 8, and the handle 10 are identical. The procedure for welding the spoon to the tooth is the same as above, in connection with the wheel shown in FIG. 1.

We claim:

1. A rotary hoe wheel having a hub, a plurality of worn teeth having worn free end portions and other end portions affixed to said hub and extending outwardly therefrom, means spaced from said hub for attaching said teeth together to hold them in spaced relationship relative to said hub, and replacement spoons affixed to common surfaces of said worn free end portions of said teeth, said replacement spoons having ends extending beyond the worn free end portions of said teeth with said spoon ends being spaced substantially equal distances from said hub.

2. A rotary hoe wheel according to claim 1 characterized by said replacement spoons being affixed to the common surfaces of worn end portions of said teeth by weld metal.

3. A rotary hoe wheel according to claim 1 characterized by said spoon ends of said replacement spoons being rounded and the other ends of said replacement spoons being straight, each of said replacement spoons having a concave face on one side and a convex face on the other side, with the convex faces being affixed to the common surfaces of said worn free end portions of said teeth.

4. A rotary hoe wheel according to claim 3 characterized by said convex faces of said replacement spoons being affixed to the common surfaces of the worn end portions of said teeth by weld metal.

5. A method of reconstructing a rotary hoe wheel having a hub, a plurality of worn teeth having worn free end portions and other end portions attached to said hub and extending outwardly therefrom, said method comprising providing a replacement spoon for each of said worn teeth with said spoon having a rounded end, a convex face, and a concave face, placing the spoon in contact with a common surface of the worn free end portion of each of the worn teeth with the rounded end of the spoon spaced a predetermined, fixed distance from the hub of the rotary hoe wheel, holding the spoon in position, and welding the convex face of the spoon to the common surface of the worn end portion of the tooth.

6. A method according to claim 5 characterized by sequentially repeating the positioning, holding, and welding steps for each of the worn teeth of the rotary hoe wheel.

7. A method according to claim 5 characterized by engaging the spoon with a fixture and contacting a portion of the fixture with a portion of the hub while placing the spoon in contact with the common surface of the worn free end portion and holding the spoon in position.

8. A method according to claim 7 characterized by the fixture having a recess and placing the spoon in the recess to engage the spoon with the fixture.

* * * * *